H. L. WILBER.
AUTOMOBILE FOOTBOARD.
APPLICATION FILED SEPT. 26, 1919.
1,367,221.
Patented Feb. 1, 1921.
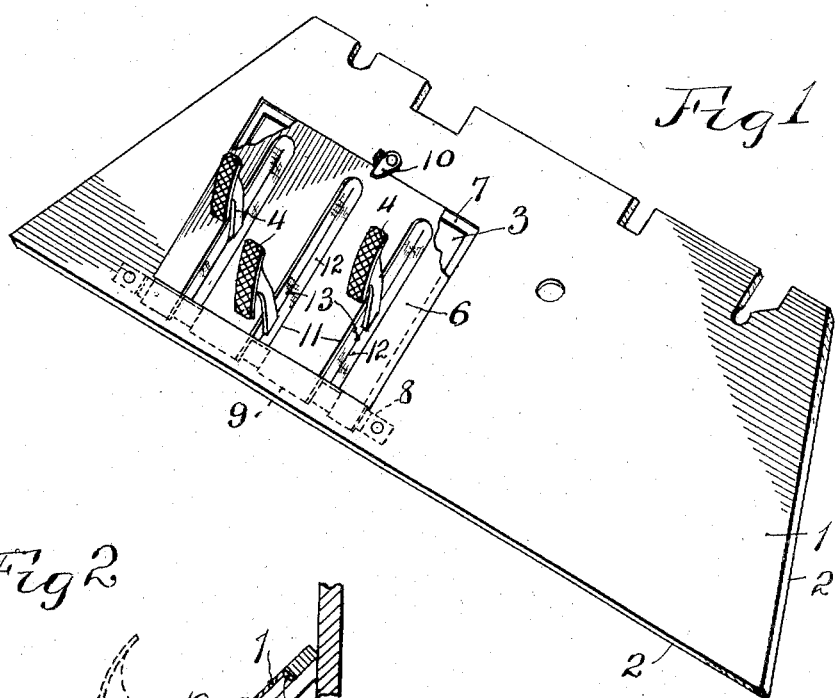
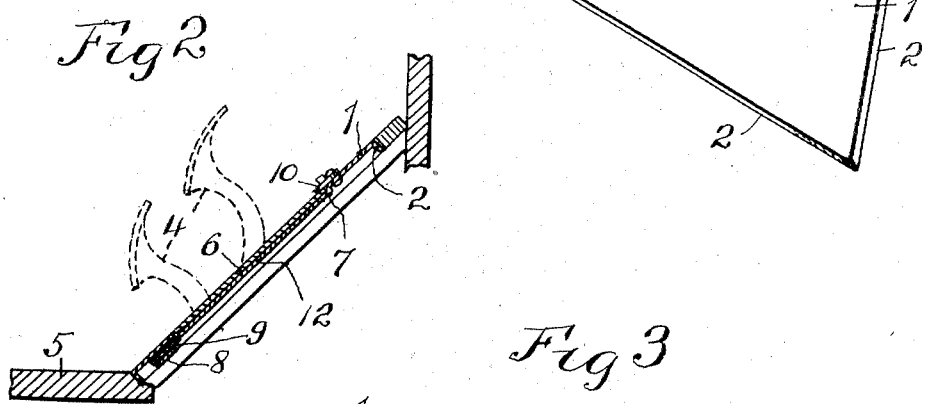
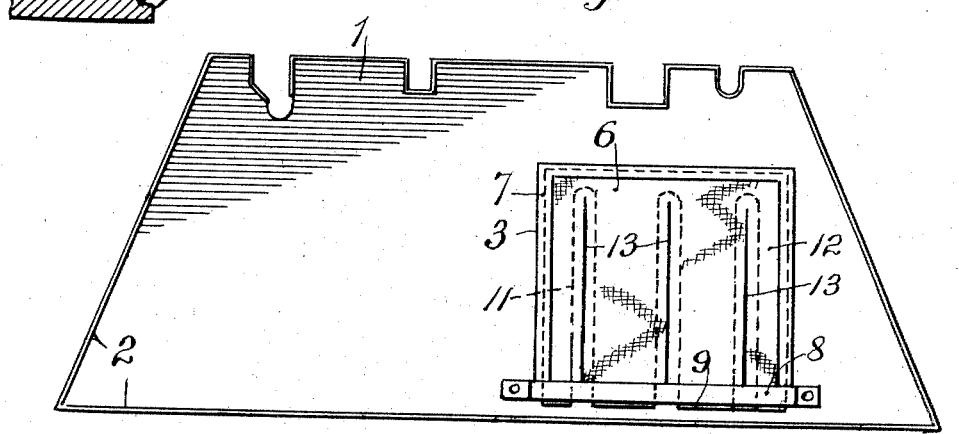
Witness:
R. E. Hamilton
Inventor
Harry L. Wilber
By Warren D. House,
His Attorney.

UNITED STATES PATENT OFFICE.

HARRY L. WILBER, OF KANSAS CITY, MISSOURI, ASSIGNOR OF SEVENTY-SIX ONE-HUNDREDTHS TO BERT C. WILLIAMS, OF KANSAS CITY, MISSOURI.

AUTOMOBILE-FOOTBOARD.

1,367,221.     Specification of Letters Patent.     Patented Feb. 1, 1921.

Application filed September 26, 1919. Serial No. 326,569.

*To all whom it may concern:*

Be it known that I, HARRY L. WILBER, a citizen of the United States, residing at Kansas City, in the county of Jackson and State of Missouri, have invented a certain new and useful Improvement in Automobile Footboards, of which the following is a specification.

My invention relates to improvements in automobile foot-boards.

The object of my invention is to provide an automobile foot board which is simple in construction, cheaply manufactured, which will not warp nor be affected by the elements, which may be readily substituted for the foot-board of certain automobiles now in general use, which is durable and not liable to get out of order, and which has novel means for closing the slots through which the pedals extend.

My invention provides further a novel sheet metal foot-board which is light and strong and which has a smooth upper surface throughout.

The novel features of my invention are hereinafter fully described and claimed.

In the accompanying drawing, which illustrates the preferred embodiment of my invention,—

Figure 1 is a perspective view of my improved foot board, partly broken away.

Fig. 2 is a cross section of the same, shown mounted in position on an automobile, a portion of which is shown.

Fig. 3 is an under view of my improved foot board.

Similar reference characters designate similar parts in the different views.

My improved foot-board comprises, preferably, a sheet metal floor plate 1 having flanged edges 2 and provided with an opening 3 adapted to receive therethrough the controlling pedals 4 of an automobile.

The floor plate 1 is adapted to be mounted in an inclined position at the forward end of the floor 5 of an automobile, as shown in Fig. 2.

Covering the opening 3 is a removable plate 6, which is preferably of sheet metal and which rests in a depressed seat portion 7, Figs. 1 and 3, provided at the upper and side edges of the opening 3, in the floor plate 1.

The removable plate 6 preferably has its upper surface flush with the upper surface of the floor plate 1, thereby providing the foot board with a smooth upper side. By reason of this construction the edges of the removable plate 6 are not exposed, so that nothing can strike them or get under them in a way tending to bend or injure the plate. Also, when the operator moves his foot to apply the pedals, his foot can not catch against the edges of the plate 6, thereby removing an element of danger.

Attached, preferably to the under side of the floor plate 1 is a supporting strip comprising a narrow metal plate 8, which is attached at its ends to the floor plate 1 and which, between its ends, is spaced apart from the floor plate.

The lower end of the removable plate 6 has an off-set portion 9, Fig. 2, which is insertible between the floor plate 1 and the supporting plate 8. The shoulder at the upper side of the off-set portion 9 rests against the edge of the floor plate 1 at the lower side of the opening 3, thereby holding the removable plate 6 from sliding downwardly.

Pivoted to the upper side of the floor plate 1 is a turn button 10, Fig. 1, which is adapted to be moved to a position over the plate 6 so as to hold the latter in the seat portion 7.

The plate 6 is provided with one or more slots 11 adapted to receive therethrough the pedals 4, said slots extending, preferably, upwardly, from the lower end of the plate 6.

For closing the slots 11 to prevent the escape of heat and noxious fumes, the under side of the plate 6 is provided with a covering 12, preferably a flexible substance such as felt, leather or rubber and which is provided with slits 13, adapted to receive the pedals 4. The slits 13 permit the pedals 4 to move in the slots 11, the flexible nature of the covering 12 causing the latter to fit tightly against the pedals thereby closing the slots.

In affixing the foot board to a machine, the plate 6 is detached from the plate 1 and the latter is mounted in the seat provided in the automobile therefor, the pedals 4 being inserted through the opening 3. The plate 6 is then slipped at its lower off-set end between the supporting plate 8 and the plate 1.

The pedals 4 pass into the slots 11 and slits 13. The plate 6 is then fitted against the depressed seat portion 7, following which the turn button 10 is turned so as to project over the top of the plate 6, as shown in Fig. 1, thus holding the plate 6 releasably in its operative position.

As the upper side of the plate 6 is flush with the upper side of the plate 1, the upper surface of the floor board is smooth and unbroken, excepting for the projection of the turn button 10.

I do not limit my invention to the structure shown and described, as many modifications, within the scope of the appended claims, may be made without departing from the spirit of my invention.

What I claim is:—

1. An automobile foot board comprising a sheet metal floor plate having flanged edges and an opening and having a depressed seat portion at one edge of said opening, a supporting plate attached to said floor plate and having a portion spaced apart therefrom, and a removable plate covering said opening and resting on said seat portion and between the floor plate and the supporting plate and having a slot adapted to receive a pedal.

2. An automobile foot board comprising a floor plate having an opening and a depressed seat portion at one edge of said opening, a supporting plate attached to said floor plate adjacent to another edge of said opening and having a portion spaced apart from the floor plate, a removable plate covering said opening and resting on said seat portion and between the floor plate and said supporting plate and having a slot adapted to receive a pedal, and releasable means for holding said removable plate on said seat portion.

3. An automobile foot board comprising a floor plate having flanged edges and an opening and having a depressed seat portion at one edge of said opening, a supporting plate attached to said floor plate having a portion spaced apart therefrom, and a removable plate covering said opening and resting on said seat portion, and having an off-set end insertible between the floor plate and the supporting plate and having a shoulder which rests against the edge of the floor plate at the lower side of said opening, the removable plate having a slot adapted to receive a pedal.

In testimony whereof I have signed my name to this specification.

HARRY L. WILBER